United States Patent [19]
Comte et al.

[11] 3,873,478
[45] Mar. 25, 1975

[54] POLYURETHANE-PROTEIN COMPOSITION AND PROCESS FOR MAKING SAME

[75] Inventors: Philippe Comte, Sainte Foy Les Lyon, France; Wilhelm Fischer, Pirmasens, Germany

[73] Assignees: Centre Technique Du Cuir, Lyon, France; Pruf-und Forschungsinstitut Fur Die Schuh Herstellung, Pirmasens, Germany

[22] Filed: July 30, 1973

[21] Appl. No.: 383,501

[30] Foreign Application Priority Data
July 27, 1972  France .............................. 72.27768

[52] U.S. Cl. ...................... 260/7.5, 117/142, 260/6
[51] Int. Cl. ........................ C08g 41/04, C08h 7/00
[58] Field of Search .................................. 260/6, 7.5

[56] References Cited
UNITED STATES PATENTS
2,808,398  10/1957  Forward ................................ 260/6
3,663,472  5/1972  Raymond .............................. 260/6

FOREIGN PATENTS OR APPLICATIONS
147,209  7/1952  Australia ............................. 260/7.5

*Primary Examiner*—Morris Liebman
*Assistant Examiner*—Edward Woodberry
*Attorney, Agent, or Firm*—Karl F. Ross; Herbert Dubno

[57] ABSTRACT

Proteinic substances are degreased (defatted), dried and pulverized and combined with polyurethane precursors (i.e. polyols and di, tri or polyisocyanates) to form a leatherlike composition.

8 Claims, No Drawings

POLYURETHANE-PROTEIN COMPOSITION AND PROCESS FOR MAKING SAME

FIELD OF THE INVENTION

The present invention relates to a process of producing compositions of polyurethanes and proteinic substances, and to the product of this process.

BACKGROUND OF THE INVENTION

Polyurethanes are generally obtained by reacting an isocyanate with an active site such as the OH group of an alcoholic polymer or polyol. The alcoholic polymers used are in general either polyethers obtained, for example, from ethylene oxide or propylene oxide, or polyesters. Other molecules can also react with the isocyanate and give rise to various compounds. This is the case with amines, acids or water.

As a general rule, for polyurethanes, the longer the initial polymer chain, the fewer will be the number of OH group or active sites, and consequently the chemical reactions with the isocyanate will be less numerous. This property is used mainly for the preparation of rigid or flexible foam sponges. In the case of rigid foam sponge the chain lengths are shorter and, consequently, the specific number of OH groups greater, thus increasing the degree of cross-linking. In equal amounts, polyethers with different chain lengths will react with different quantities of isocyanate. The longer the chain of an alcoholic polymer, the less isocyanate will be needed. At the present time, polyurethanes are principally used in the manufacture of foam sponges, elastomers, coatings and adhesives.

According to circumstances, either so-called prepolymers, semi-pre-polymers, or polymers are used, but at relatively high cost. In the "one shot" process for the production of polyurethane the constituents were mixed at the moment of manufacturing the desired article. However, this process is relatively tricky to use. One of the principal applications of the "one shot" process is the manufacture of so-called "integrated skin" foam sponges made in a closed mold and resulting in finished articles which have a closed surface and a microcellular structure in the body of the material. These foam sponges are used in the manufacture of shoe soles of a density well below 1 and generally in the region of 0.5 – 0.6 g/cm³.

In all cases the monomers used, namely the polyols and isocyanates, are fairly costly and this price factor, linked with the difficulties in using them, forms a considerable obstacle to the expansion of the use of polyurethanes in certain fields where consumption is heavy, such as shoe soles or the coating of cloths and leathers.

With the aim of reducing cost, attempts were made some years ago to add to polyurethane compositions, low cost mineral fillers such as silicas or silicates, chalk, kaolin or clay. However, most polyurethane applications use injection or casting techniques and, consequently, pumping and control systems, often made from stainless steel. The mineral fillers in the monomers of the polyurethanes or of the pre-polymers were found to be harmful, because these fillers were present in the form of grains or particles in dispersions which were fine and unstable. They quickly attack the equipment, especially the pumping, injection or casting flow paths, and the wear on the latter was accelerated. It was found that the use of such was impossible and uneconomical, and it was necessary to find fillers which were compatible with the polyurethanes or their monomers, which were relatively inexpensive and which were able to blend homogeneously with the polyurethanes without reducing the optimum physico-mechanical properties of the latter.

OBJECTS OF THE INVENTION

It is an object of the invention to provide an improved process for making a polyurethane composition or polyurethane articles whereby the aforementioned disadvantages are obviated.

Another object of the invention is to provide an improved polyurethane composition which is of low cost, of high processability, safe as regards wear of processing and handling equipment, and capable of producing a large variety of articles of high quality.

Still another object of the invention is to provide polyurethane articles of low cost and high physico-mechanical properties.

DESCRIPTION OF THE INVENTION

These objects and others which will become apparent hereinafter are attained in accordance with the present invention which is based on our discovery that proteinic fillers can be substituted for the mineral fillers hitherto used in polyurethane compositions without any of the disadvantages of the mineral fillers as enumerated above.

The proteinic fillers of the invention are those made from any natural or synthetic protein, defatted or degreased, dried and pulverized to yield a pulverulent material retaining active sites capable of racting with isocyanates as the latter do with amines, acids, polyols and water so that the protein is, in effect, incorporated chemically in the composition as part of the polyurethane matrix.

Surprisingly, this type of filler incorporation does not materially alter certain properties associated otherwise with the polyurethane, may even improve these properties, and materially reduces the cost of polyurethane compositions on a weight or volume basis.

More particularly the invention comprises:

preparing proteinic substances of animal or vegetable origin, with or without denaturing and with or without cutting them into pieces, by treating them with an agent (e.g. steam or a solvent capable of eliminating, at least partially, any fatty components;

drying the proteins thus treated, by atomization, lyophilization, hot air or by any other drying method;

pulverizing the proteinic substances as finely as possible to grain sizes of between 100 and 250 microns;

incorporating at ambient temperature the proteinic substances in the form of a fine powder in the polyol (alcohol polymer) or in the urethane pre-polymers, with or without a solvent, in proportions of from 10 to 100% of proteins in relation to the polymer (corresponding to 0.1 to 1 part by weight of the filler per part by weight of the polymer);

leaving the filler and polymer precursor in contact for 1 to 24 hours, depending on the polymer, in order to disperse the proteins without changing the viscosity of the medium nor causing the proteins to swell, and if desired adding colorants or cross-linking chemicals; and mixing the dispersion of proteinic substances thus obtained with the isocyanate to produce polyurethanes which directly contain the filler and which can be used to make finished articles by injection, by casting, by cross-linking, or by any other method currently in use for dealing with polyurethanes.

The raw materials used for carrying out this process can be animal or vegetable. They can come from skins and waste pieces of skins of bovines, sheep, goats, horses and pigs. Such skins are available in different form: as skins from freshly-skinned animals, as salted skins, as dried skins, as limed skins, as pickled skins, or as waste bits of fresh, salted, dried, limes and pickled skins. These proteins of animal origin can also be obtained from other tissues such as bones, tendons or cartillage.

It is possible to use proteinic substances derived from these raw materials and obtained either in a fibrous form by dispersion and regeneration by chemical or mechanical means, or by denaturation after a thermal, chemical or physical treatment. This is the case with bone gelatines or waste bits of skin.

Finally, the proteinic substances can come from such animal or vegetable sources as casein from milk, fish meal or meat meal, flours of vegetable origin such as soya flour or peanut flour, and also keratins of hair or feathers converted to.

The raw material used must be treated, where necessary, to rid if of fatty substances which could adversely affect the later use of the polyurethane-protein mixtures. Thus the raw material can be shredded in the wet condition by using suitable equipment such as knife-type chopping machines, rotary defibering machines, pulverizer-choppers, or any other equipment with similar action. Depending on the kind of protein, the elimination of the fatty substances is carried out by steam which emulsifies the fats or by an organic solvent such as acetone, trichloroethylene, perchloroethylene, or a methanol-chloroform mixture.

The proteinic substances, after being degreased, are then dried - according to their degree of moisture and the degreasing treatment, e.g. by atomization, lyophilization, or hot air, taking care that the temperature does not excees 120°C in order to avoid severe hydrolysis of the protein.

It is essential to the invention that after the drying operation the water content of the proteins should be as low as possible, and preferably, should not exceed 3% by weight. It is well known that isocyanates react with water to give secondary decomposition products, creating in the polyurethane foams a macro-cellular structure which weakens the physico-mechanical properties of the body. Furthermore, excessive water increases the amount of isocyanate consumed and leads to poor economy. It is therefore necessary to eliminate during the drying operation the capillary water and the bulk water, so that the only water remaining is that which is physically bonded to the protein molecule. This is the case for water contents below 3% in collagenic proteins of skins and animal tissues.

Following the drying operation, the proteinic substances are converted into fine powders in which the grain size varies from 100 to 250 microns by means of hammer-type pulverizers, knife-type pulverizers, percussion-type pulverizers, pulverizers using a strong air current, or by any other apparatus having a similar action. The proteinic products thus obtained have quite different chemical and physical structures, but all possess one point in common: they are made up of fairly long peptidic chains formed from strong acids, with an acidic or basic character depending on the pH of the medium or on the method of preparation. In addition, the proteins contain other functional groups, such as —OH or —SH groups, and a repeated peptidic link, characterised by the amide group —CO—NH—.

The proteins possess, therefore, active sites and it has been seen that the isocyanates can react with these different groups. It is necessary to account for these reactions during the formation of the polyurethanes since each protein is characterized by a relatively constant number of functional groups, acidic, basic or hydroxyl. These groups are responsible for the good water-absorption properties found in certain proteins such as collagens or keratins. The reaction with the isocyanates determines whether or not a certain number of these sites are kept free, and allows variations in the water-absorption ability of the protein combined with the polyurethane.

Proteins are not generally soluble in organic solvents, but it is possible in certain cases to obtain proteinic solutions in an organic solvent. Thus, collagenic proteins from skins can be dissolved, after ionizing the molecule in an acid medium, in protic solvents such as dimethylsulphoxide, m-cresol, formamide or dimethylformamide. In such solutions the proteins are found in a denatured state since the collagen, for example, no longer possesses a molecular weight of 100,000. It differs, however, from gelatine in that it can be reversibly regained in a fibrous form by intensive coagulation.

It is, therefore, possible to add the dried proteins to polyurethane latexes or to pre-polymer in organic solution, generally in a solvent such as dimethylformamide, in order to obtain homogeneous solutions of which the viscosity varies very little. These solutions can be used for numerous and diverse applications, such as adhesives or for coating cloths and natural and synthetic leathers. The mixing is carried out at ambient temperature in proportions of from 10 to 100% of proteins (by weight) in relation to the polyurethane pre-polymer or to the polymer. After homogenizing the medium by mechanical agitation the mixture is ready for use, and the solvent is driven off from the resulting article either by coagulation and drying, or by direct drying, or in the case of adhesives by evaporation of the solvent, thereby simultaneously initiating the polyurethane reaction. In the case of coatings, the products obtained have good gas permeability and can have any desired capacity for absorbing water - which is particularly important in the case of synthetic leathers or coated leathers and cloths for shoes or furniture - even to the point of being substantially water repellant.

It is likewise possible to add the proteins, dried and pulverized in the form of fine powders, to polyols. The mixing is carried out at ambient temperature with mechanical agitation, in proportions of 10 to 100% of proteins in relation to the polyol. The viscosity of the medium increases slightly but does not harm the process, and no swelling of the proteins is observed. This is due to the fact that in the presence of alcohols or polyols the structure of the proteins is not affected, but on the contrary is stabilized, for in numerous cases, such as collagen or serum-albumin, the denaturing temperature of the protein is raised. By X-ray diffraction it has been found that the polyalcohol chains have a tendency to replace the molecules of water in the interior of the protein structure and to arrange themselves parallel to the peptidic chains.

The alcoholic polymers (polyols) used for forming the polyurethanes are either aliphatic polyethers, obtained for example from ethylene oxide or propylene oxide, or ramified or linear polyesters obtained, for example, by the reaction of adipic acid or of orthophthalic anhydride with a glycol or a tricol.

If it is desired to produce rigid polyurethanes, it is possible to add tanning agents, such as aldehydes, to the dispersion of proteins in the polyol, and these tanning agents become fixed on the protein and increase its degree of cross-linking. Furthermore, this reaction enables less isocyanate to be subsequently consumed because of the reduced number of active sites on the protein, particularly the reduced number of amine and amide groups, and in conjunction with this to reduce the degree of absorption of the water in the mixture - - which is desirable in the case of certain articles produced by casting, particularly soles for shoes. It is likewise possible at this stage to add colorants which become irreversibly fixed on the protein, to produce articles colored throughout in a homogeneous manner and in which the coloration cannot subsequently spread through the material into other areas. In casting and injection processes, and particularly in the "one shot" process, the monomers are delivered separately by a pumping and control system into a mixing head directly joined to the mold for the desired article. The reaction then takes place in the mold, after it is closed, for a period which varies according to the type of monomers used, and with a variable emission of heat. During all the time it is being used the dispersion of proteins in the polyol is kept agitated. The reaction takes place at ambient temperature, and because of this the viscosity of the medium varies very little.

The isocyanates which can be used are many and varied, but the preferred compounds of this group are tolylene di-isocyanate, diphenylmethane, di-isocyanate and hexamethylene di-isocyanate. The majority of these products are, incidentally, liquid at ambient temperature.

The characteristics of the polyurethanes obtained are scarcely changed by the presence of the proteinic fillers in the polyols. The speed and duration of the urethane-forming reaction are identical to, and the densities of the product close to, those of polyurethanes without fillers. On the other hand, the presence of the fillers normally changes the physico-mechanical properties of the polyurethanes, particularly the breaking strain, elongation, hardness or abrasion. However, it is important to note that these properties are not changed in proportion to the amount of protein added, and so this fact allows the amount of protein to be varied over a wide range to suit the desired article.

The manufacture of articles from mixtures of polyurethanes and proteins is carried out by injection, casting or cross-linking with conventional equipment as used at the present time, and it is found that the presence of the proteinic fillers does not cause corrosion of the plant. The resulting products are intended for various fields such as motor cars, furniture, coatings synthetic leathers, shoes, fancy leather goods, and any other field in which polyurethanes are used where a low density is desired.

EXAMPLE

Waste bits of limed skin ("carnasses") are pulverized, treated with steam to remove the fats, centrifuged and dried at 110°C. After pulverizing the collagenic proteins are in the form of a fine powder having an average grain size of 150 microns.

To 1000 g of a commercial polyol (ethylene glycol-adipic acid reaction product), containing initially a suitable quantity of a swelling agent, are added 400 g of the collagenic protein powder containing 5% of fatty substances and having a water-content of 2.5%. The mixture is agitated at ambient temperature of 1 hour. At the end of 1 hour, 20 g of a red commercial colorant are added, and this is mixed in intimately for 5 minutes.

To this dispersion of collagenic powder in the polyol, 700 g of a commercial di-isocyanate (tolylene disocyanate) are added at ambient temperature and with agitation. Emission of gas and a heating-up of the mixture are observed. An aliquot part of the reacting mixture is rapidly poured into a mold cavity measuring 200 × 200 × 10 mm, and the mold is closed as soon as the pouring is completed. It is then left for 8 minutes and at the end of this time there results a slab of 200 × 200 × 10 mm, with a density of 0.52, and a collagenic protein content around 20% by weight in relation to the finished product.

What is claimed is:

1. A process for producing a polyurethane composition which comprises the steps of:

forming a proteinic powder of a particle size of 100 to 250 microns;

mixing said proteinic powder with a polyurethane precursor selected from the group consisting of polyethylene oxide, polypropylene oxide and a polyester formed by reacting adipic acid or orthophthalic anhydride with a glycol or triol in an amount of substantially 0.1 to 1 part by weight of said powder per part by weight of said precursor; and thereafter polymerizing the resulting mixture of the powder and precursor in the presence of an isocyanate selected from the group which consists of tolylene di-isocyanate, diphenylmethane di-isocyanate and hexamethylene di-isocyanate to produce polyurethane with said powder chemically bonded therein.

2. The process defined in claim 1 wherein said proteinic powder is formed by degreasing animal or vegetable protein by treating same with steam or an organic solvent; drying the degreased protein to a water content of at most 3% by weight; and pulverizing the degreased dried protein.

3. The process defined in claim 2 wherein said protein is treated with an organic solvent selected from the group which consists of trichloroethylene, perchloroethylene, acetone or a chloroform-methanol mixture for the degreasing of the protein.

4. The process defined in claim 2 wherein said protein is bovine, sheep, goat or pig skin or bone; tendon or cartilage tissue, is hair or feather keratin, is casein from milk, is fish meal, is meat meal, is soya flour or is peanut flour.

5. The process defined in claim 4 wherein said prepolymer is formed with an excess of isocyanate capable of reacting with the powder.

6. The process defined in claim 4 wherein the mixing and polymerizing steps are each carried out at ambient temperature.

7. The process defined in claim 4 wherein a colorant is added to the powder-precursor mixture.

8. A polyurethane composition which comprises:

a proteinic powder of a particle size of 100 to 250 microns;

a polyurethane precursor selected from the group consisting of polyethylene oxide, polypropylene oxide, and a polyester formed by reacting adipic acid or orthophthalic anhydride with a glycol or triol wherein the weight ratio of said powder to said precursor is substantially from 0.1 to 1 part of said powder to 1 part of said precursor; and an isocyanate amounting to about 33% by weight of the total composition selected from the group consisting of tolylene di-isocyanate, diphenyl methane di-isocyanate, and hexamethylene di-isocyanate, which is reacted simultaneously with said powder and said precursor to yield said polyurethane with said powder chemically bonded thereto.

* * * * *